(12) United States Patent
Curtis

(10) Patent No.: US 11,400,960 B2
(45) Date of Patent: *Aug. 2, 2022

(54) UNIVERSAL MULTI-ROLE AIRCRAFT PROTOCOL

(71) Applicant: Sydney Robert Curtis, Highlands, NC (US)

(72) Inventor: Sydney Robert Curtis, Highlands, NC (US)

(73) Assignee: Sydney Robert Curtis, Highlands, NC (US)

( * ) Notice: Subject to any disclaimer, the term of this patent is extended or adjusted under 35 U.S.C. 154(b) by 580 days.

This patent is subject to a terminal disclaimer.

(21) Appl. No.: 16/163,940

(22) Filed: Oct. 18, 2018

(65) Prior Publication Data

US 2019/0276054 A1    Sep. 12, 2019

Related U.S. Application Data

(63) Continuation of application No. 14/843,565, filed on Sep. 2, 2015, now Pat. No. 10,112,625, and a continuation of application No. 14/516,464, filed on Oct. 16, 2014, now Pat. No. 9,126,677.

(51) Int. Cl.
| | |
|---|---|
| *B61C 13/04* | (2006.01) |
| *B64C 27/56* | (2006.01) |
| *B64C 29/00* | (2006.01) |
| *B64D 31/04* | (2006.01) |
| *B64C 19/00* | (2006.01) |
| *B64C 13/04* | (2006.01) |
| *B64D 43/00* | (2006.01) |

(52) U.S. Cl.
CPC ............... *B61C 13/04* (2013.01); *B64C 13/04* (2013.01); *B64C 13/042* (2018.01); *B64C 19/00* (2013.01); *B64C 27/56* (2013.01); *B64C 29/00* (2013.01); *B64C 29/0091* (2013.01); *B64D 31/04* (2013.01); *B64D 43/00* (2013.01)

(58) Field of Classification Search
CPC ......... B64C 13/04; B64C 19/00; B64C 27/56; B64C 29/00; B64D 31/04
USPC .......................................................... 244/234
See application file for complete search history.

(56) References Cited

U.S. PATENT DOCUMENTS

| | | | |
|---|---|---|---|
| 3,109,613 | A | 11/1963 | Bryant et al. |
| 3,179,357 | A | 4/1965 | Lyon |
| 3,246,862 | A | 4/1966 | Celniker et al. |
| 3,269,674 | A | 8/1966 | Girard |
| 3,612,444 | A | 10/1971 | Girard |
| 3,693,911 | A | 9/1972 | Bacon |

(Continued)

FOREIGN PATENT DOCUMENTS

| | | |
|---|---|---|
| EP | 0 265 035 A1 | 4/1988 |
| EP | 2 119 626 A1 | 11/2009 |

(Continued)

OTHER PUBLICATIONS

International Search Report for PCT/US2015/041342, dated Oct. 28, 2015, 4 pages.

(Continued)

*Primary Examiner* — Christopher P Ellis
(74) *Attorney, Agent, or Firm* — Sterne, Kessler, Goldstein & Fox P.L.L.C.

(57) ABSTRACT

The Curtis Protocol, an aircraft control interface, is provided. The Curtis Protocol standardizes the division and selection of aircraft flight regimes and flight modes within the selected flight regime.

17 Claims, 18 Drawing Sheets

(56) References Cited

U.S. PATENT DOCUMENTS

| | | | |
|---|---|---|---|
| 3,792,827 | A | 2/1974 | Girard |
| 3,900,176 | A | 8/1975 | Everett |
| 3,986,686 | A | 10/1976 | Girard |
| 4,555,219 | A | 11/1985 | Jeffery et al. |
| 4,711,415 | A | 12/1987 | Binden |
| 4,901,952 | A | 2/1990 | Curtis |
| 4,965,879 | A | 10/1990 | Fischer, Jr. |
| 4,980,835 | A | 12/1990 | Lawrence et al. |
| 5,143,330 | A | 9/1992 | Kaye |
| 5,405,104 | A | 4/1995 | Pande |
| 5,454,530 | A | 10/1995 | Rutherford et al. |
| 6,234,422 | B1 | 5/2001 | Bolonkin |
| 6,236,912 | B1 | 5/2001 | Bomans et al. |
| 6,264,146 | B1 | 7/2001 | Hill et al. |
| 6,443,399 | B1 | 9/2002 | Yount et al. |
| 6,669,137 | B1 | 12/2003 | Chen |
| 6,678,567 | B1 | 1/2004 | Haendel |
| 6,904,340 | B2 | 6/2005 | Andre et al. |
| 7,275,711 | B1 | 10/2007 | Flanigan |
| 7,512,464 | B2 | 3/2009 | Tarleton et al. |
| 8,186,631 | B2 | 5/2012 | Iannucci |
| 8,240,617 | B2 | 8/2012 | Biest et al. |
| 8,757,537 | B2 | 6/2014 | Walliser |
| 8,844,880 | B1 | 9/2014 | Corliss |
| 9,126,677 | B1 | 9/2015 | Curtis |
| 10,112,625 | B2 | 10/2018 | Curtis |
| 2003/0094537 | A1 | 5/2003 | Austen-Brown |
| 2003/0132341 | A1 | 7/2003 | Glomstad et al. |
| 2008/0149759 | A1 | 6/2008 | Walliser et al. |
| 2008/0255713 | A1 | 10/2008 | Onu et al. |
| 2009/0045294 | A1 | 2/2009 | Richardson et al. |
| 2009/0302168 | A1 | 12/2009 | Hetrick et al. |
| 2009/0302170 | A1 | 12/2009 | Rozovski |
| 2011/0036954 | A1 | 2/2011 | Piasecki |
| 2011/0038727 | A1 | 2/2011 | Vos et al. |
| 2011/0147533 | A1 | 6/2011 | Goossen et al. |
| 2012/0091257 | A1 | 4/2012 | Wolff et al. |
| 2012/0160967 | A1 | 6/2012 | Scott et al. |
| 2012/0168568 | A1 | 7/2012 | Sonneborn |
| 2013/0043354 | A1 | 2/2013 | Shome et al. |
| 2013/0261853 | A1 | 10/2013 | Shue et al. |
| 2014/0346280 | A1 | 11/2014 | Constans et al. |
| 2015/0108283 | A1 | 4/2015 | Thoreen et al. |

FOREIGN PATENT DOCUMENTS

| | | |
|---|---|---|
| WO | WO 01/87706 A1 | 11/2001 |
| WO | WO 2008/065664 A2 | 6/2008 |
| WO | WO 2014/089604 A1 | 6/2014 |

OTHER PUBLICATIONS

Ashley, S., "X-wing aircraft," Popular Science, pp. 48, 49, 90, 91, Jul. 1987.

Bilgen, O., et al., "Novel, Bi-Directional, Variable Camber Airfoil via Macro-Fiber Composite Acuators," 50th AIAA/ASME/ASCE/AHS/ASC Structures, Structural Dynamics, and Materials Conference, May 2009.

Rutherford, J., et al., "Technology Needs for High-Speed Rotorcraft," NASA Contractor Report 177578, Apr. 1991.

"X-wing and tilt-rotor: hybrid aircraft that get up and go," Popular Science, pp. 44, 45, Jul. 1987.

Written Opinion for PCT/US2015/041342, dated Oct. 28, 2015, 10 pages.

UNIVERSAL MULTI-ROLE AIRCRAFT PROTOCOL

The present application is a continuation of U.S. application Ser. No. 14/516,464, filed Oct. 16, 2014. Embodiments of the present invention relate to aircraft control system interfaces. In particular, aircraft control system interfaces that standardize the division and selection of aircraft flight regimes and flight modes within the selected flight regime.

BACKGROUND

Field

Background

An aircraft type is derived from the Federal Aviation Administration's (FAA) type certificate designation for a particular design of an aircraft built by a particular aircraft manufacturer. Pilots are categorized according to their license to fly a particular aircraft type: fixed wing, rotary wing, or helicopter. This categorization is due primarily to the different skill sets and extensive training required for each respective aircraft type. A pilot seeking qualifications to fly a different aircraft type must undergo type initial training and flight training in the aircraft followed by simulator training, line training, and checks. The cost of training is a major expense for pilots and the commercial airline industry.

The emergence of multirole aircraft has blurred the lines between fixed wing, rotary wing, and helicopter pilots. Multirole aircraft can take off and land as a normal fixed wing aircraft in a forward flight regime, but can also, through various permutations of aeronautical devices, take-off and land vertically in a vertical flight regime. Multirole aircraft are therefore able to operate without a runway. This key development is vital due to slot restrictions at major airports stemming from limited runway space. Multirole aircraft will also help to alleviate the decline in regional air service that is so critical to cultural and commercial development in rural areas.

However, multirole aircraft have not gained widespread commercial acceptance due to the interrelated problems of crew training and safety. A pilot of the respective aircraft type develops instinctual reactions to in-flight conditions through training and experience. Instincts for aircraft types operating in the vertical flight regime are different than those for aircraft types operating in the forward flight regime. In the vertical flight regime, the pilot is primarily concerned with lift whereas in the forward flight regime, airspeed is the primary concern. In the respective aircraft type, these factors above all else keep the aircraft in a stable mode of flight. In addition, often the pilot interface for each aircraft design are proprietary and distinct to that aircraft type. Distinct controls require the pilot and crew to learn and train on each individual aircraft, which leads to increased pilot workload and confusion in the cockpit.

BRIEF SUMMARY OF THE INVENTION

Aviation in particular piloting now has a strong ingrained culture brought about by the very nature and evolved similarity of the various aircraft types. Embodiments of the present invention remedy the crew training and safety problems with a standard pilot interface—The Curtis Protocol—that the existing aviation community will readily accept and not find strange or counterintuitive. The Curtis Protocol does not seek to change aviation culture but to help pilots manage the two flight regimes—forward flight and vertical flight—by utilizing modern digital flight control management systems in a standardized format to reduce pilot work load and the possibility of confusion in the cockpit. The Curtis Protocol offers a training transition to bring widespread acceptance to multirole aircraft, which in turn will open new commercial air travel markets. In addition, the Curtis Protocol will drastically reduce the amount of pilot training required for pilots to obtain qualifications in the multirole aircraft resulting in a huge cost savings to the commercial aviation industry and the pilots themselves.

In one aspect of the invention, an aircraft control system is provided including an interface to provide an input to a flight computer representative of a first flight regime and a switch that includes a lock to selectively permit the interface to provide a second input to the flight computer representative of a second flight regime.

In another aspect of the invention, a method for controlling a flight regime of a multi-role aircraft in flight includes operating the aircraft in a first flight regime and first flight mode in response to a first input, determining a first flight characteristic of the aircraft in the first flight mode, permitting a second input representative of a second flight mode to configure the aircraft for the second flight regime in response to the second input if the first flight characteristic satisfies a condition such that the aircraft can safely transition from the first flight mode to the second flight mode. And if the second input is permitted, the aircraft is operated in the second flight mode in response to the second input.

In a further aspect of the invention, an aircraft control system is provided including a control mode selector having a rotary switch and a three position slide switch to provide an input to configure the aircraft for a selected flight regime. A flight management system receives the input and configures the aircraft for the selected flight regime by modifying an exterior control surface of the aircraft. A vertical velocity control lever provides a vertical speed input to the flight computer to control a vertical speed of the aircraft.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Features and advantages of the embodiments will become more apparent from the detailed description set forth below when taken in conjunction with the drawings, in which like reference characters identify corresponding elements throughout.

DETAILED DESCRIPTION OF THE INVENTION

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments, whether or not explicitly described.

The modern commercial aircraft cockpit typically comprises numerous instrument displays and pilot controls. For example, the pilot yokes or control columns are typically positioned intermediate each pilot or on the side of each pilot to control the roll axis and pitch of the aircraft. A flap lever is typically positioned in the area between the pilot and copilot and controls the camber or curvature and area of the wing to improve wing lift and drag characteristics.

Figure 1:
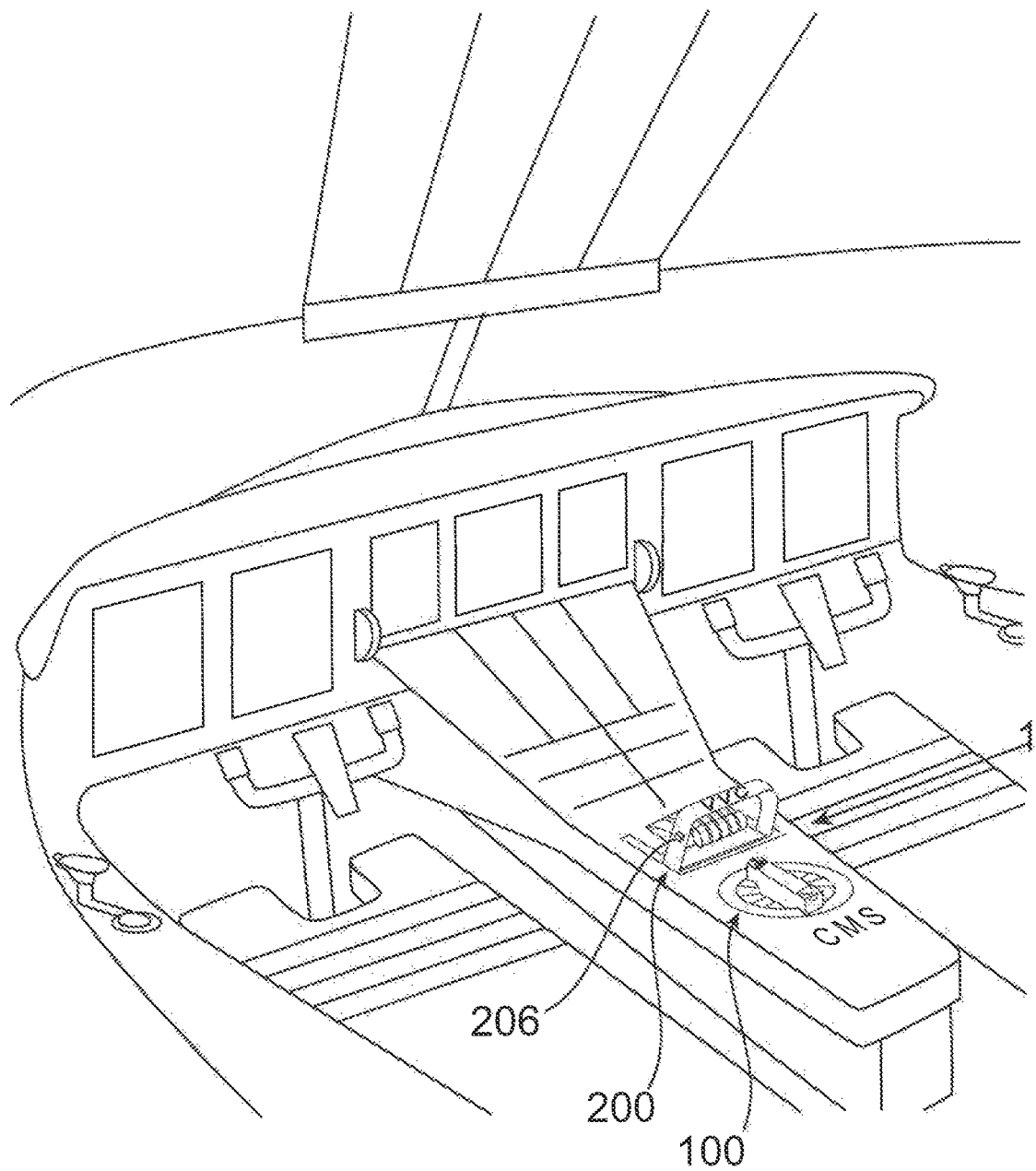
FIG. 1 is a perspective view of a prototypical aircraft cockpit and a control interface according to various aspects of the invention.
Figure 2:
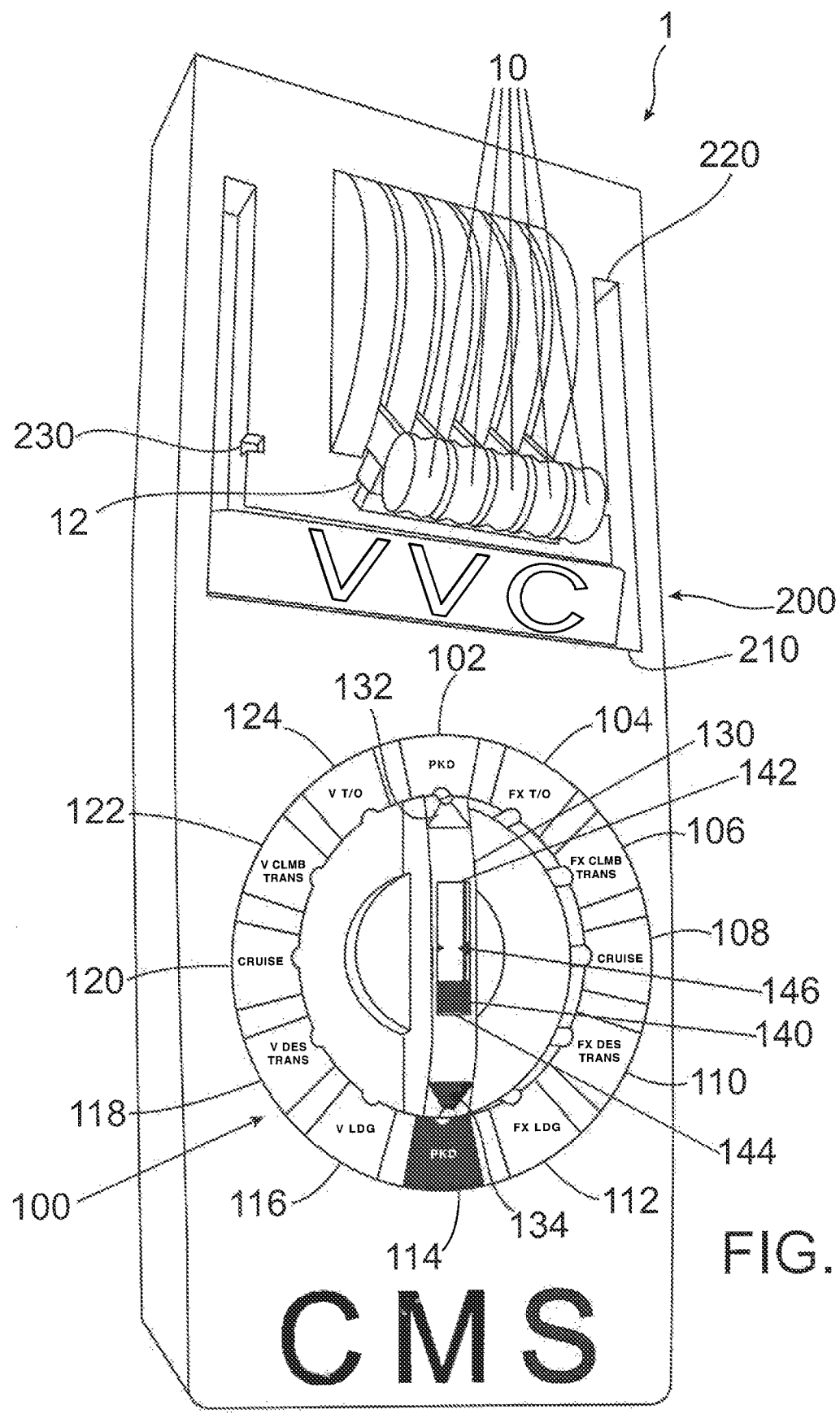
FIGS. 2-3 are perspective views of a control interface according to various aspects of the invention.
Figure 3:
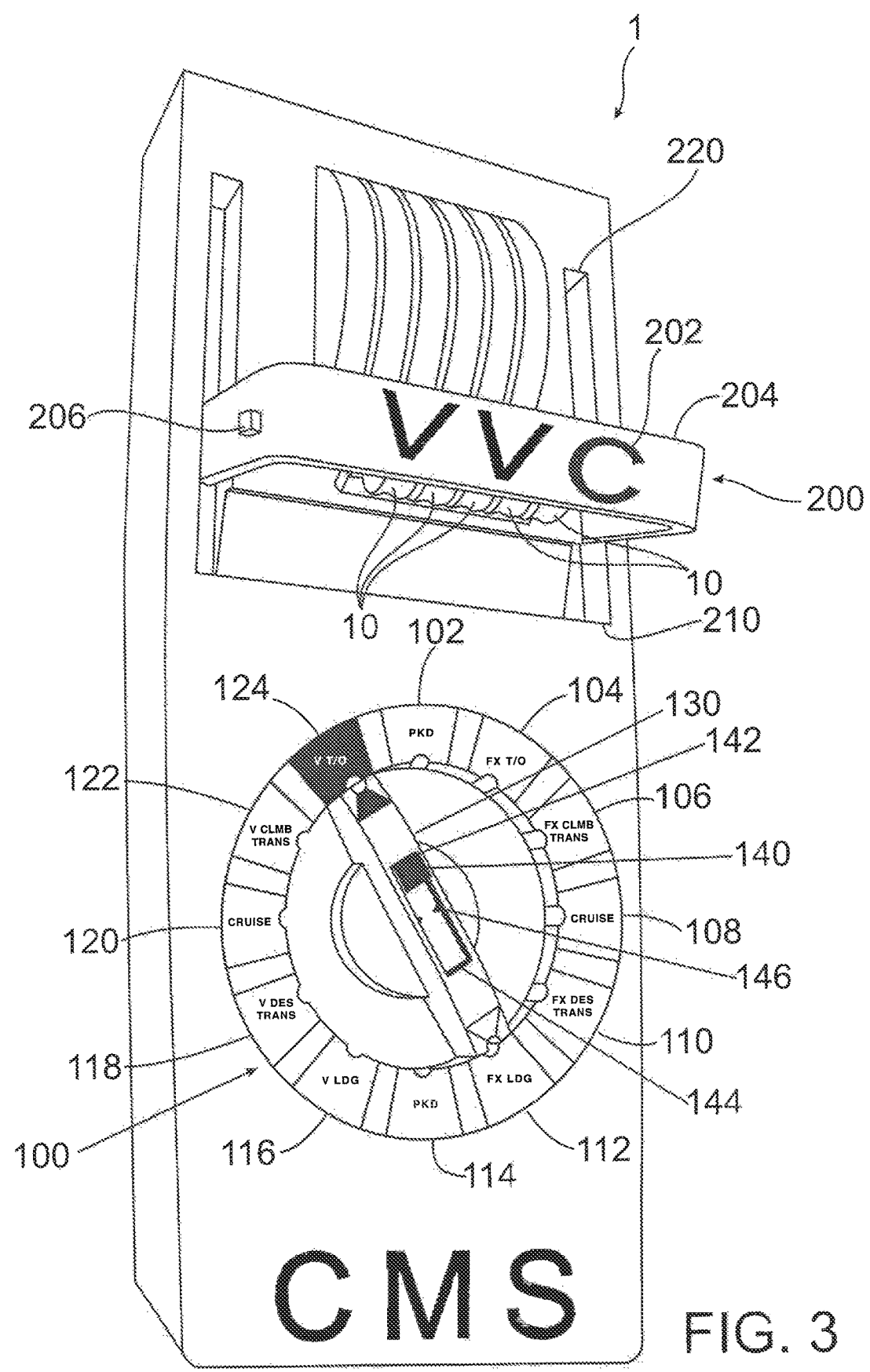
Figure 4:
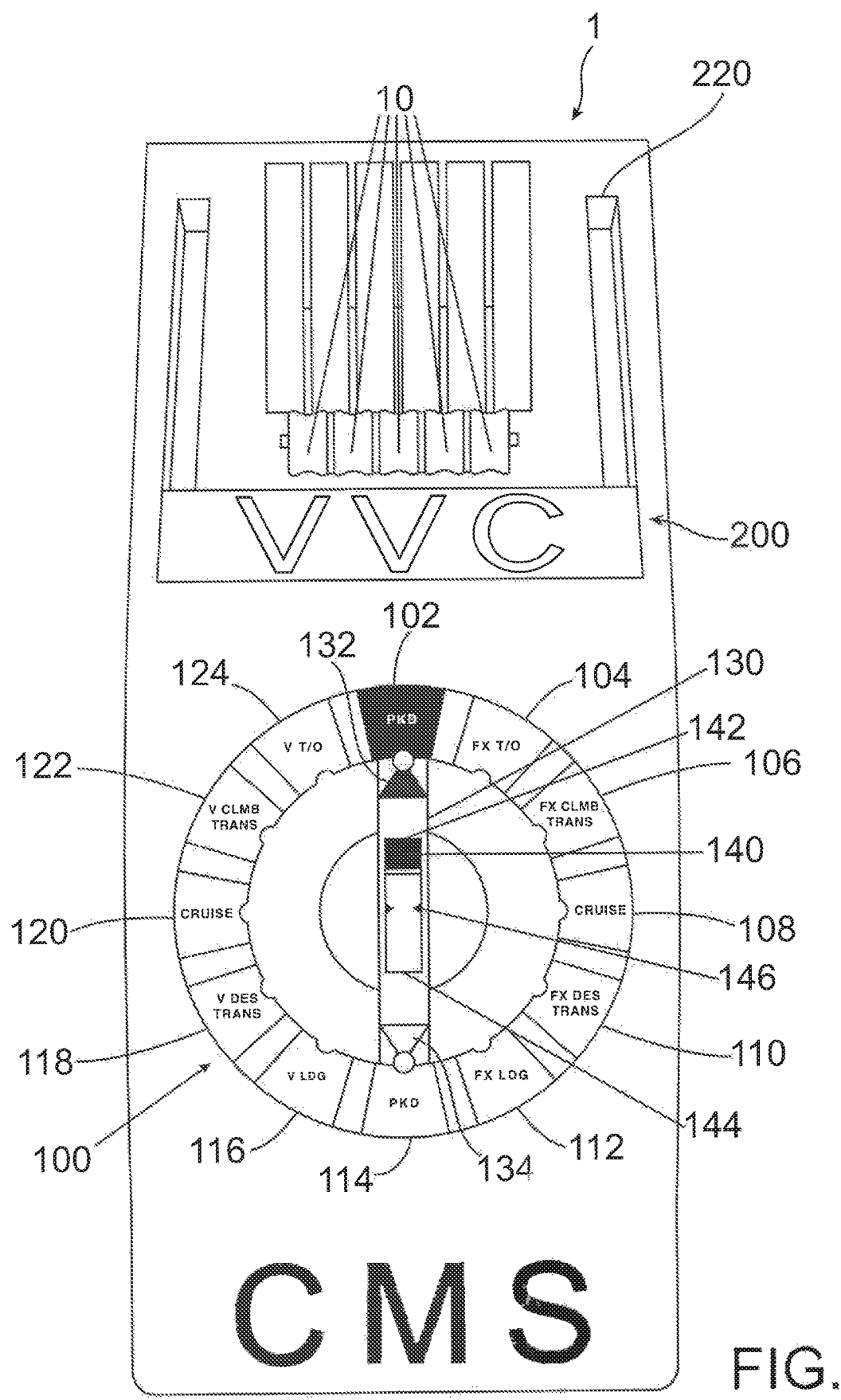
FIGS. 4-18 are plan views of an aircraft control interface according to various aspects of the invention.
Figure 5:
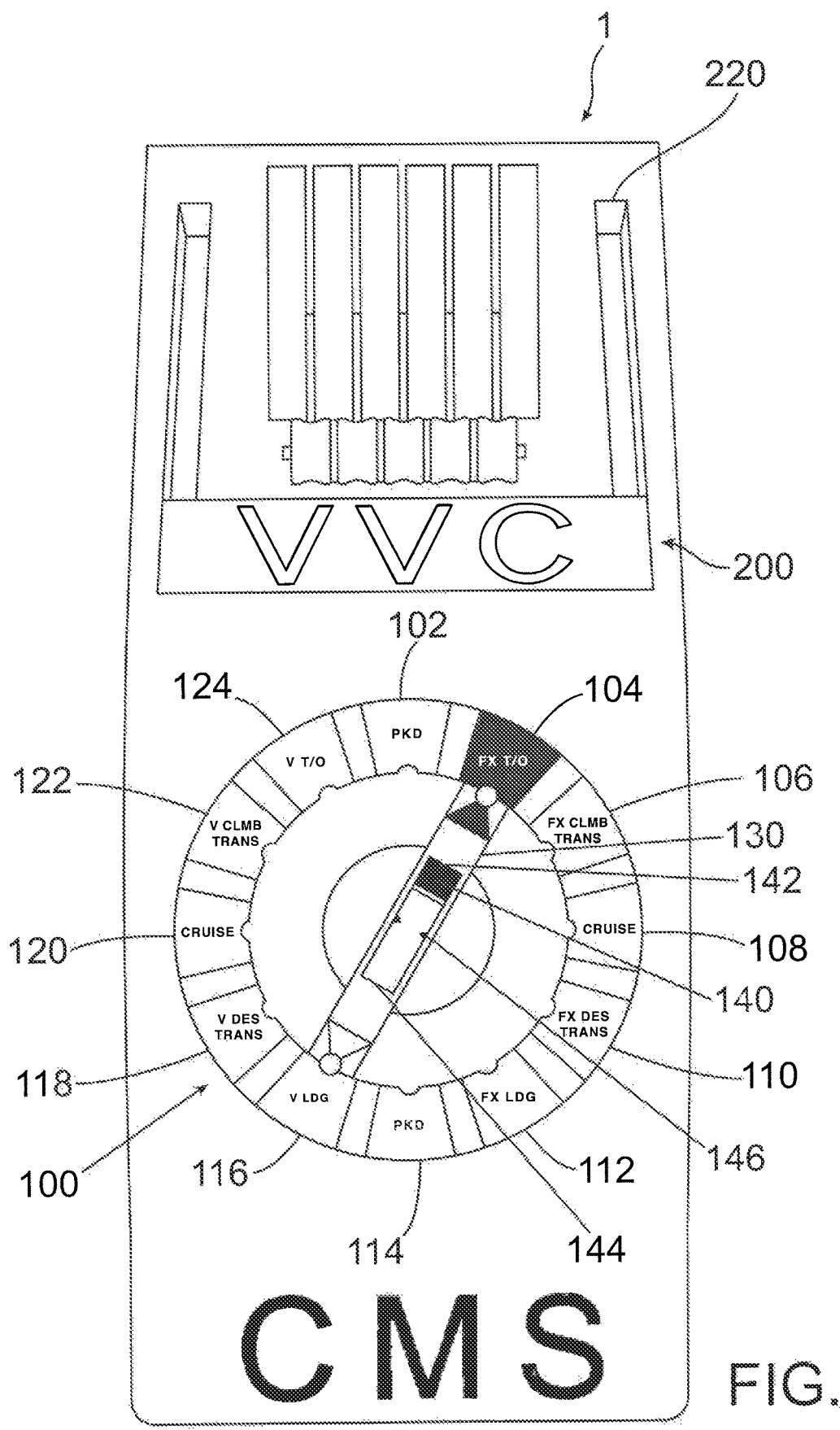
Figure 6:
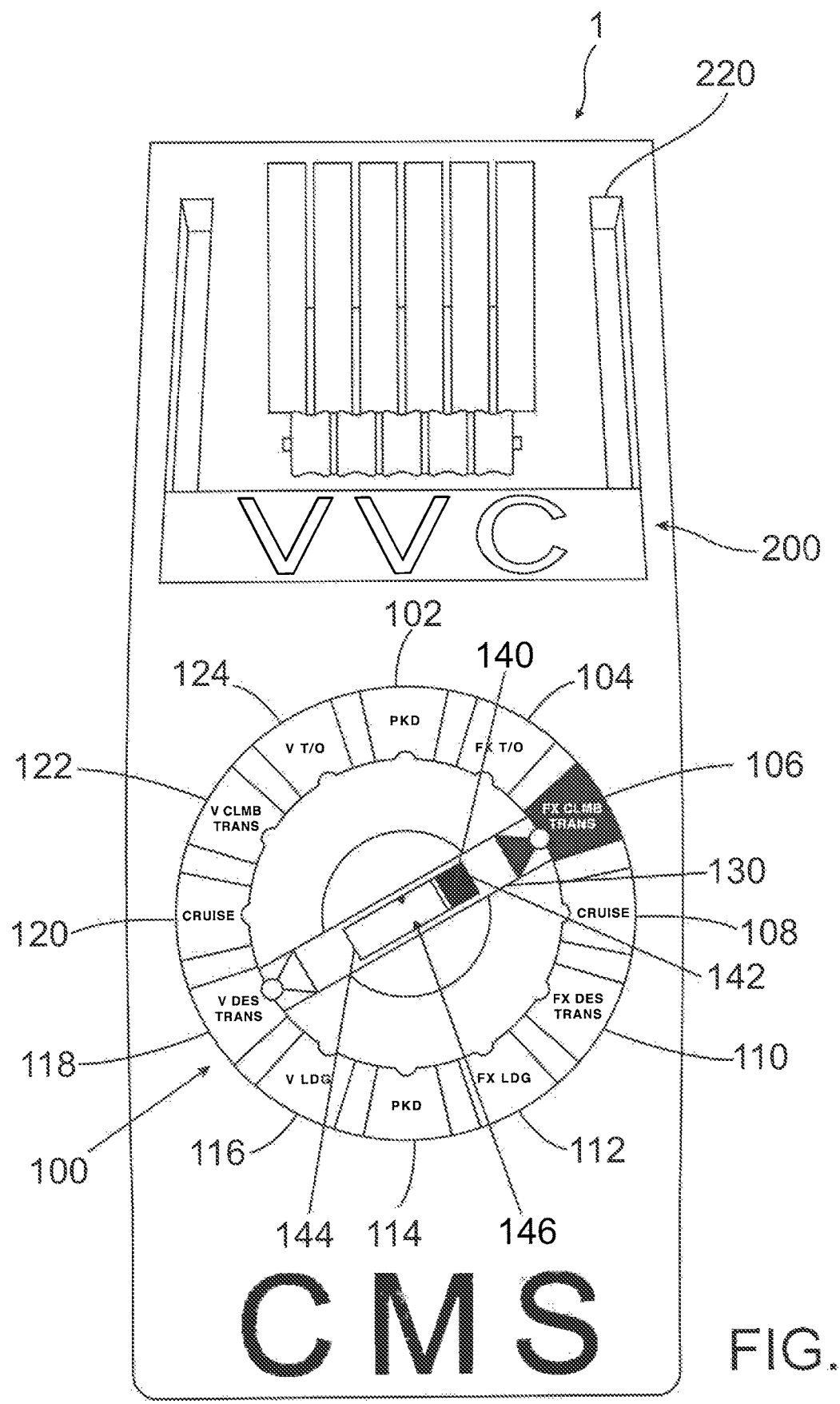
Figure 7:
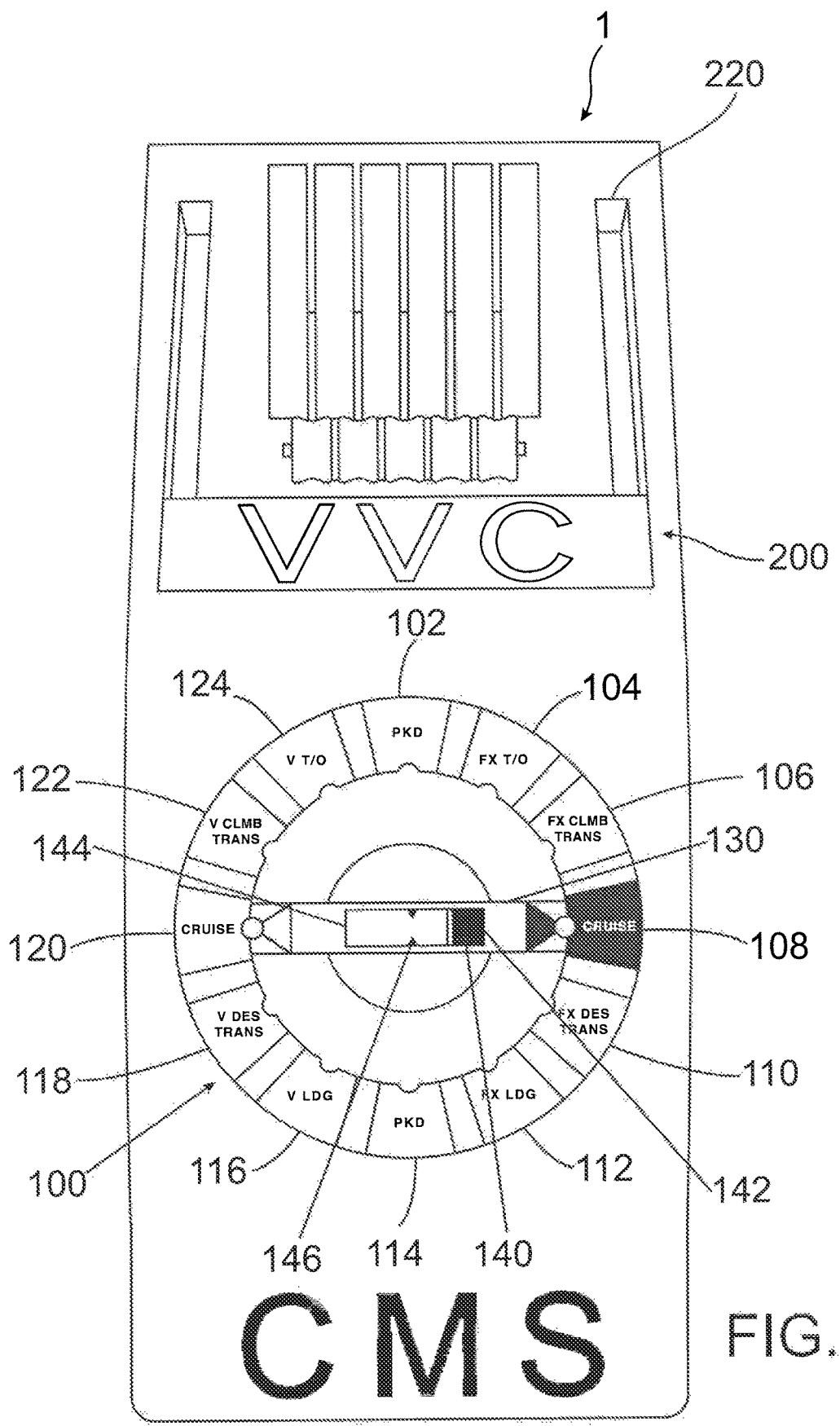
Figure 8:
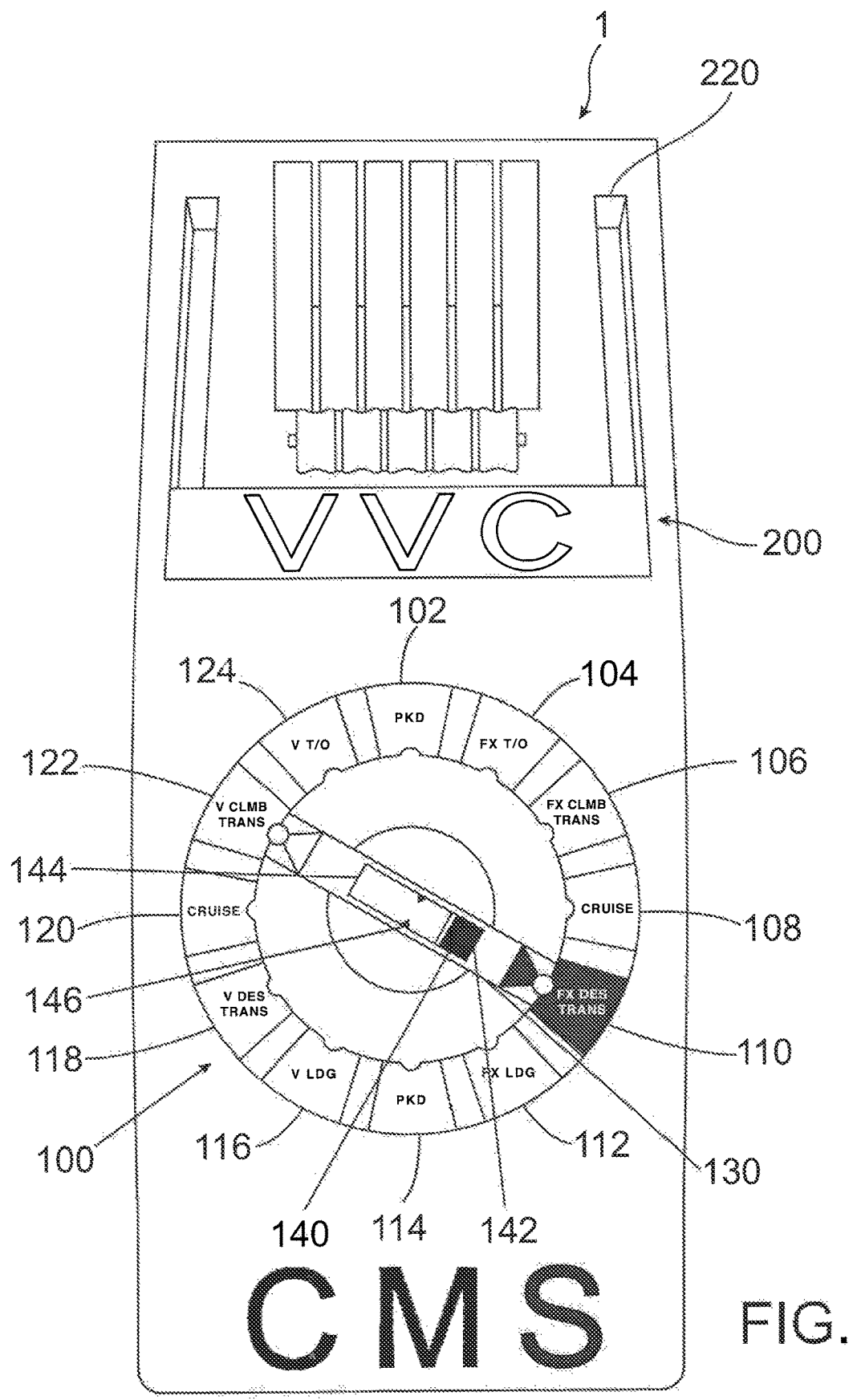
Figure 9:
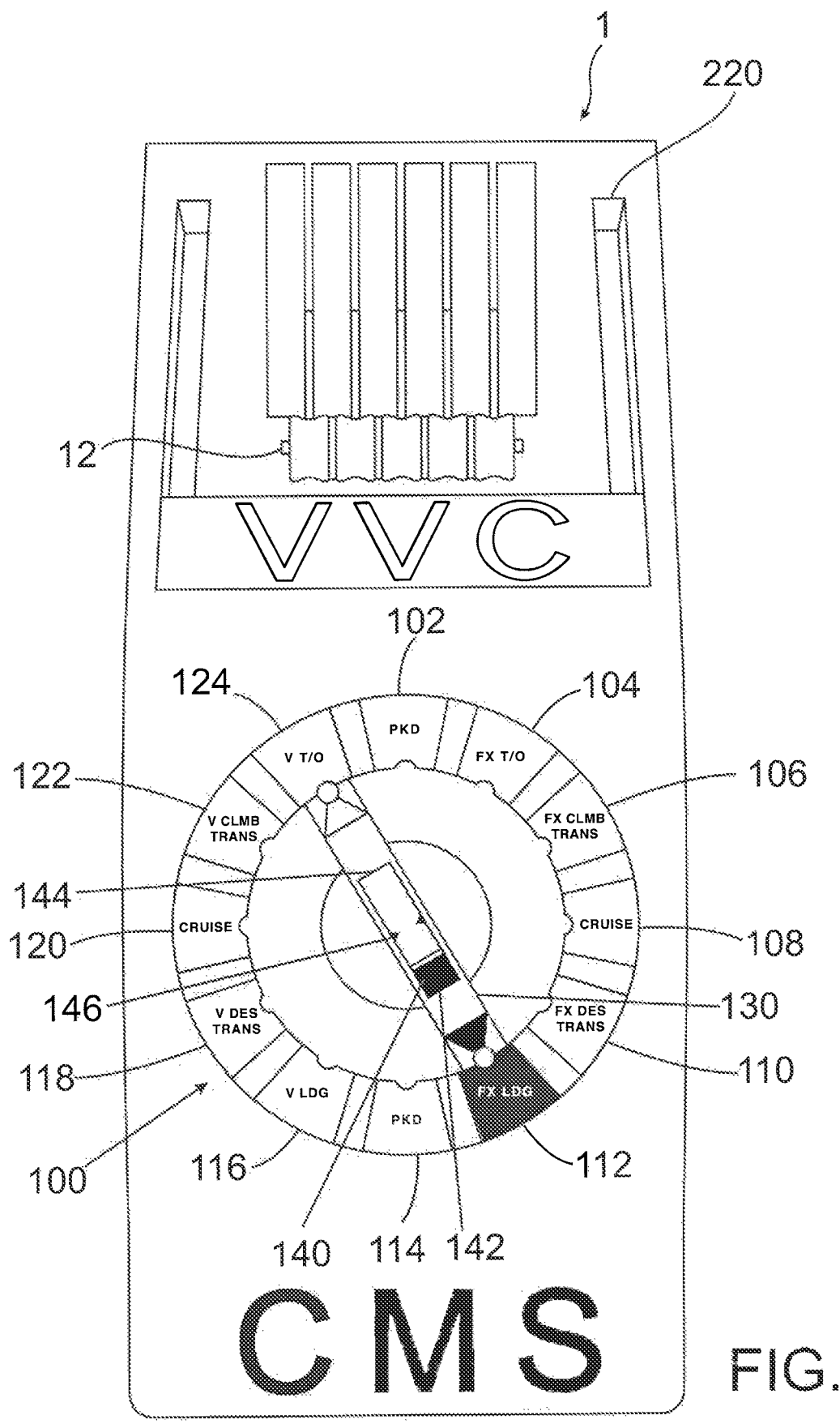
Figure 10:
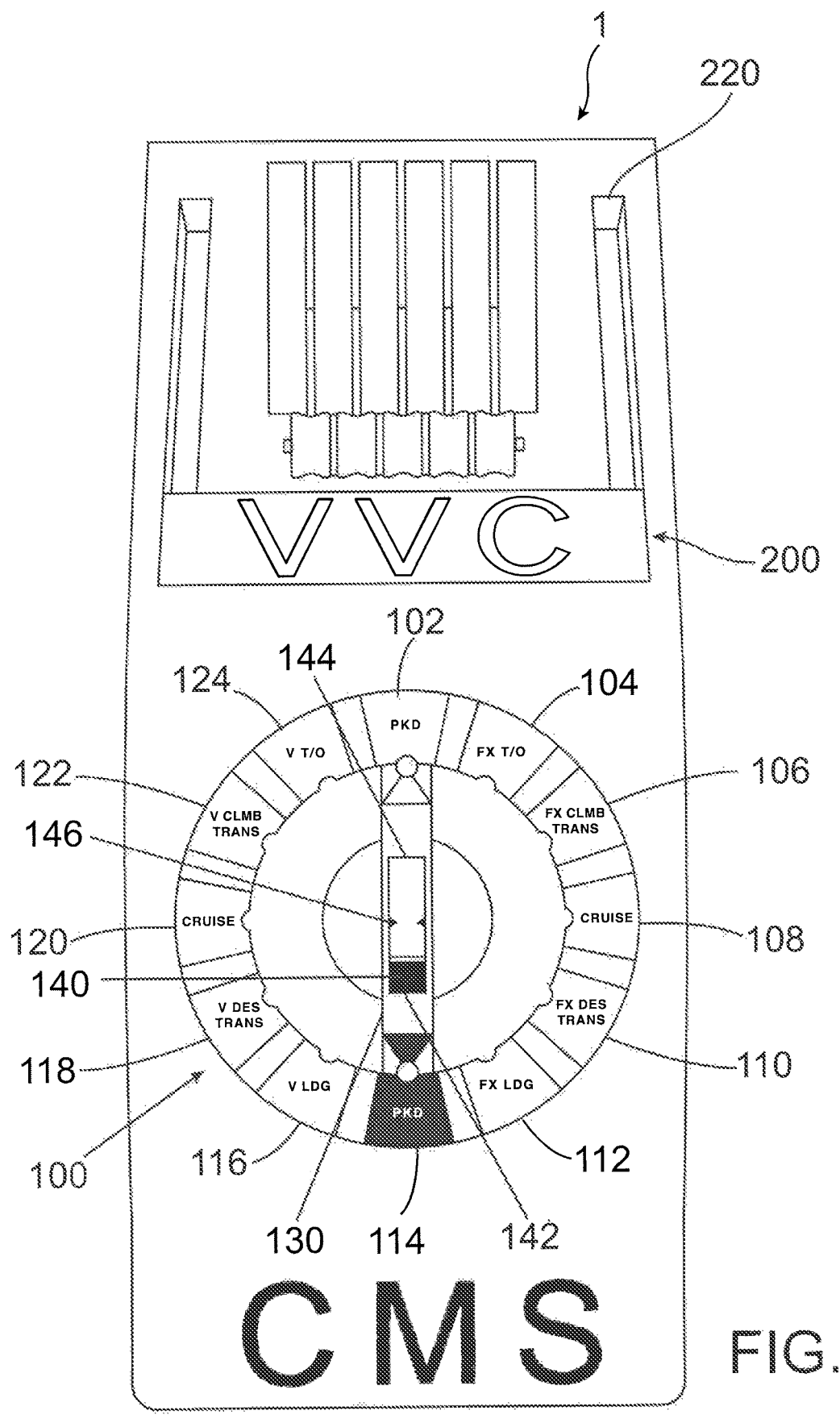
Figure 11:
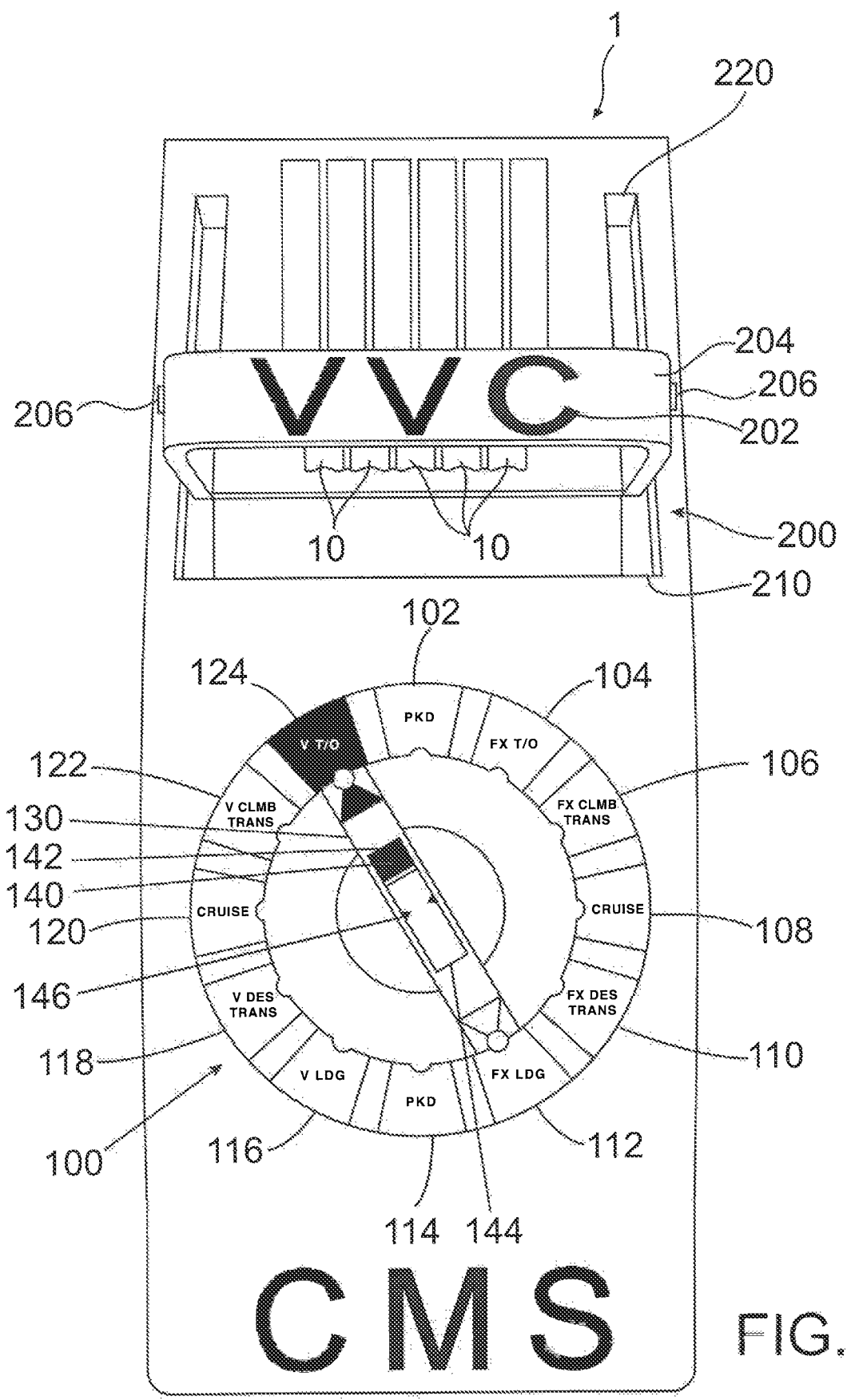
Figure 12:
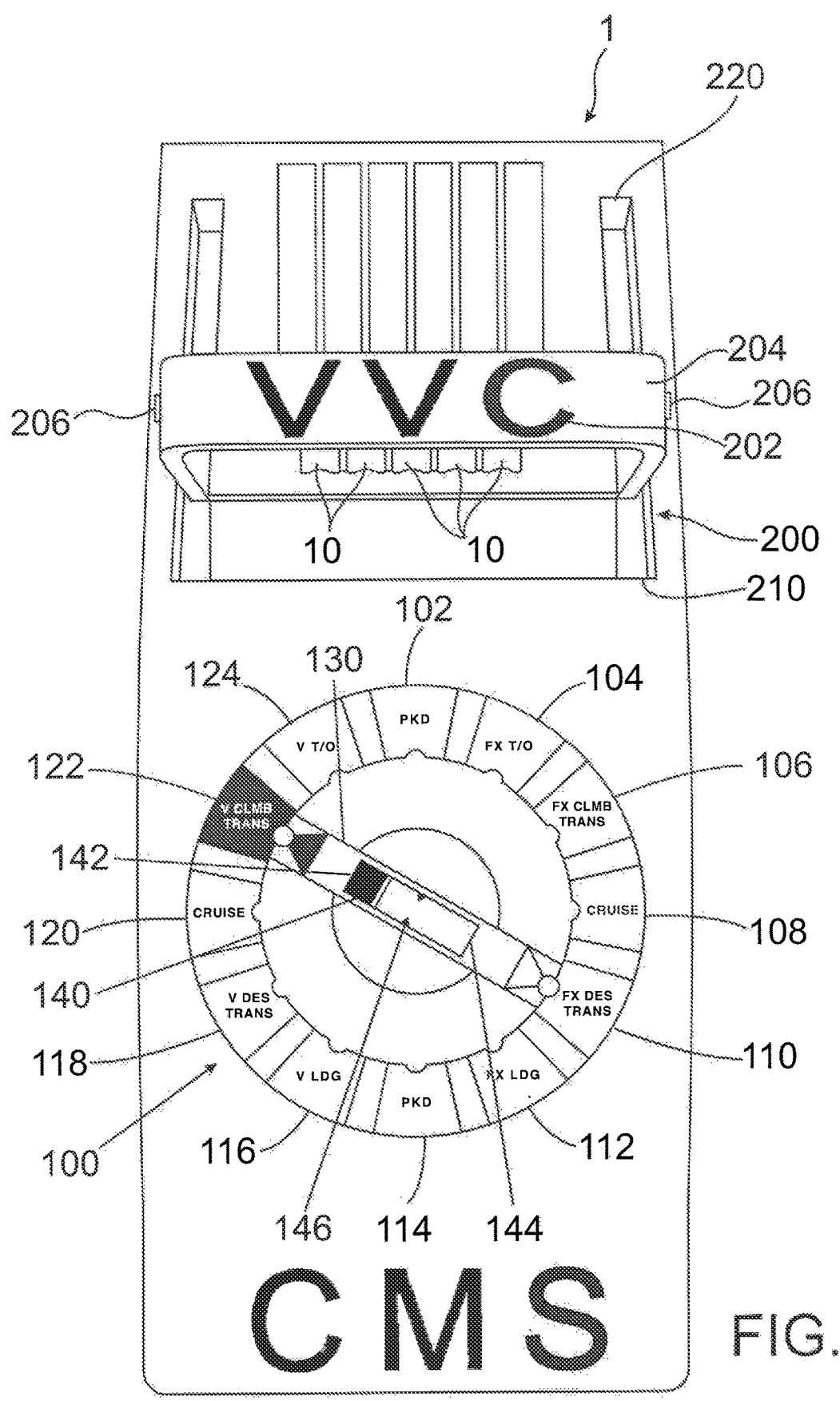
Figure 13:
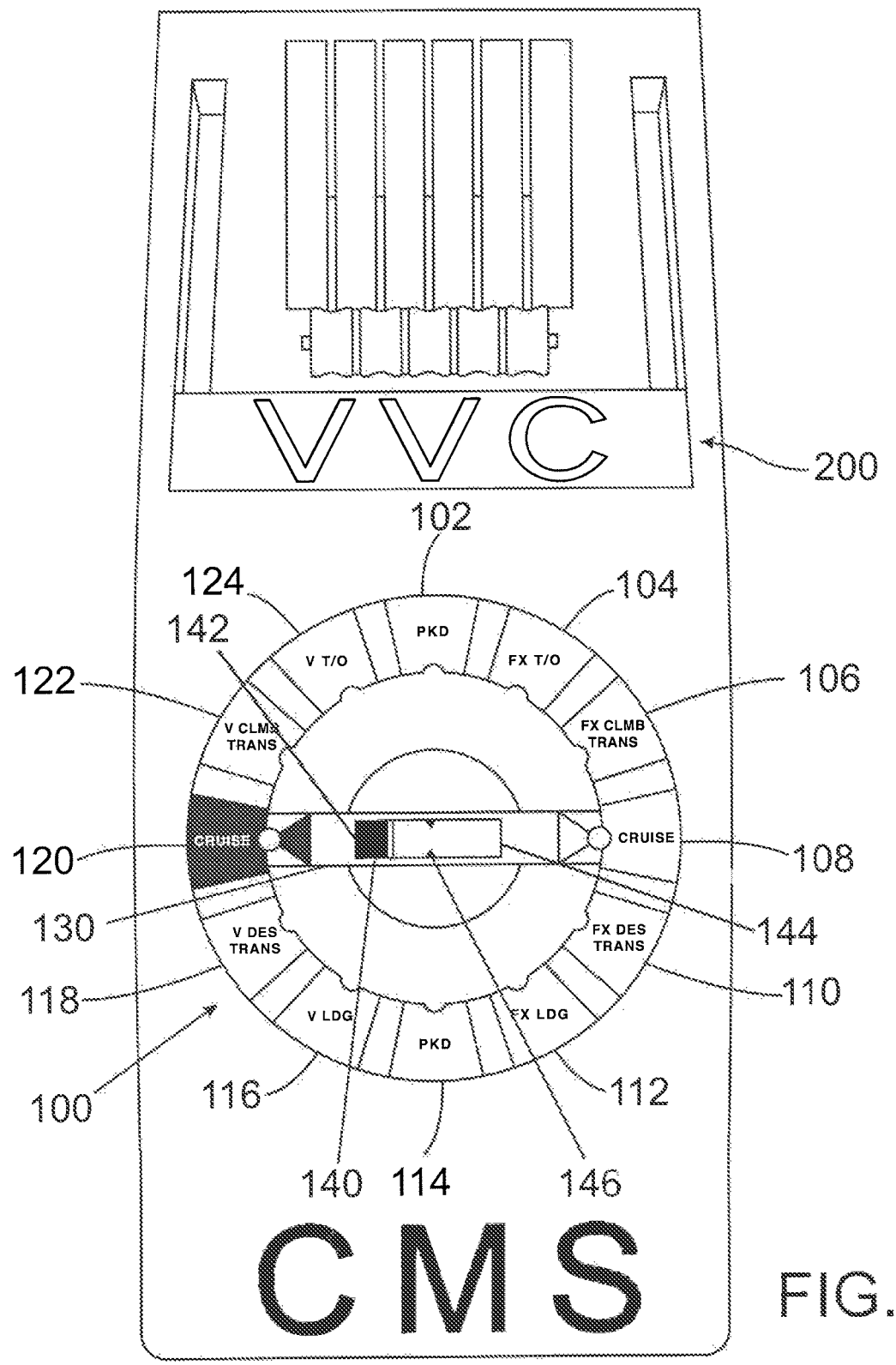
Figure 14:
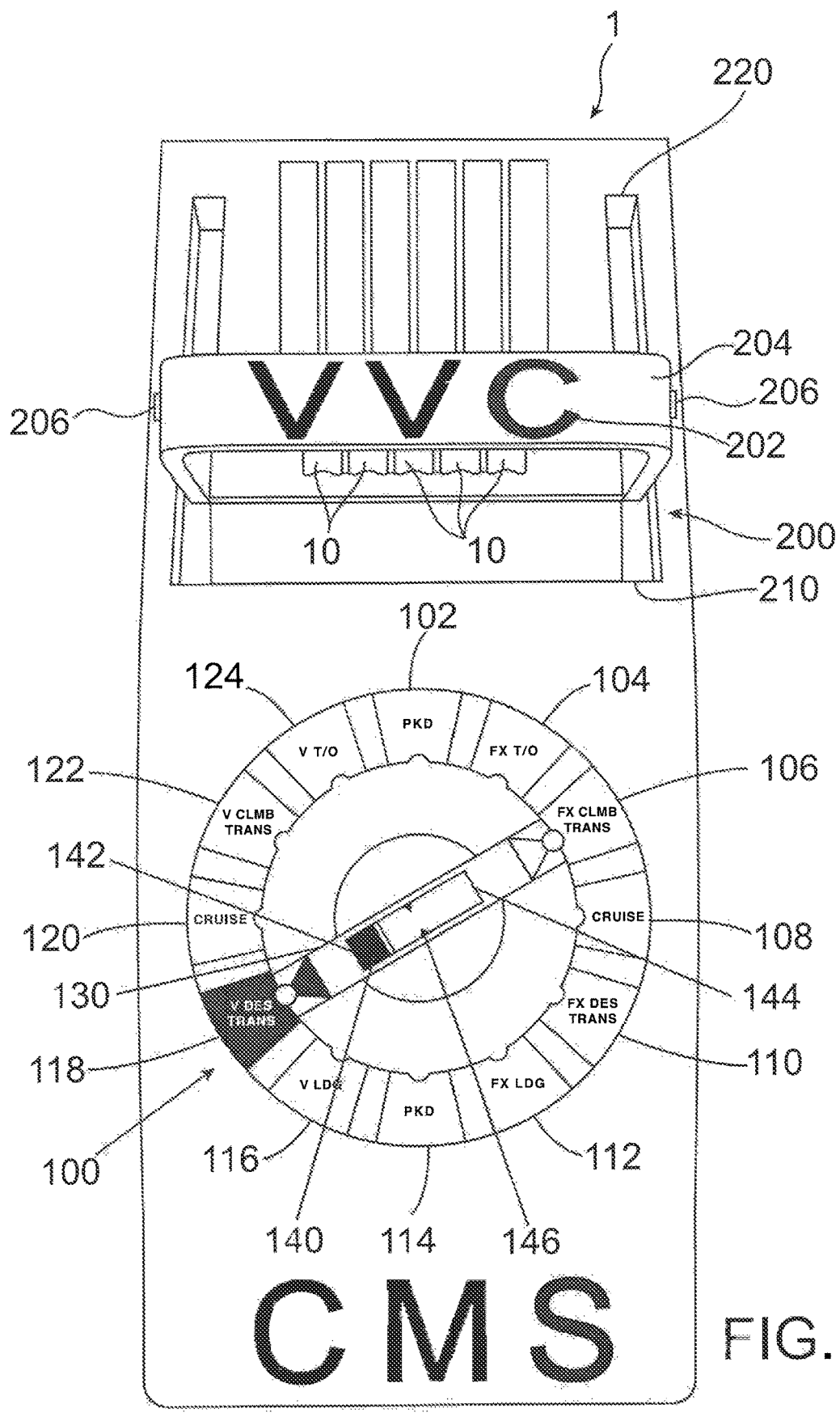
Figure 15:
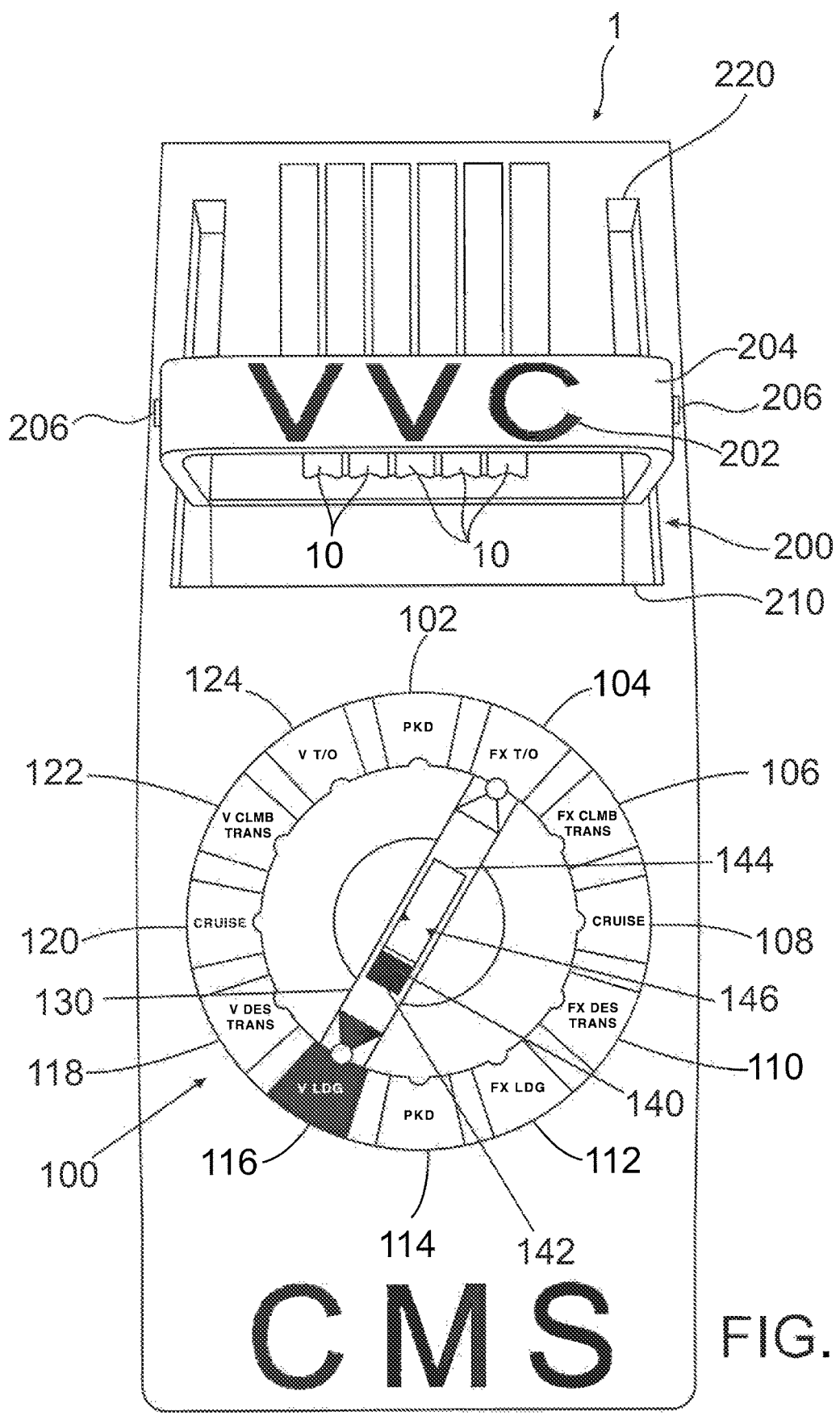
Figure 16:
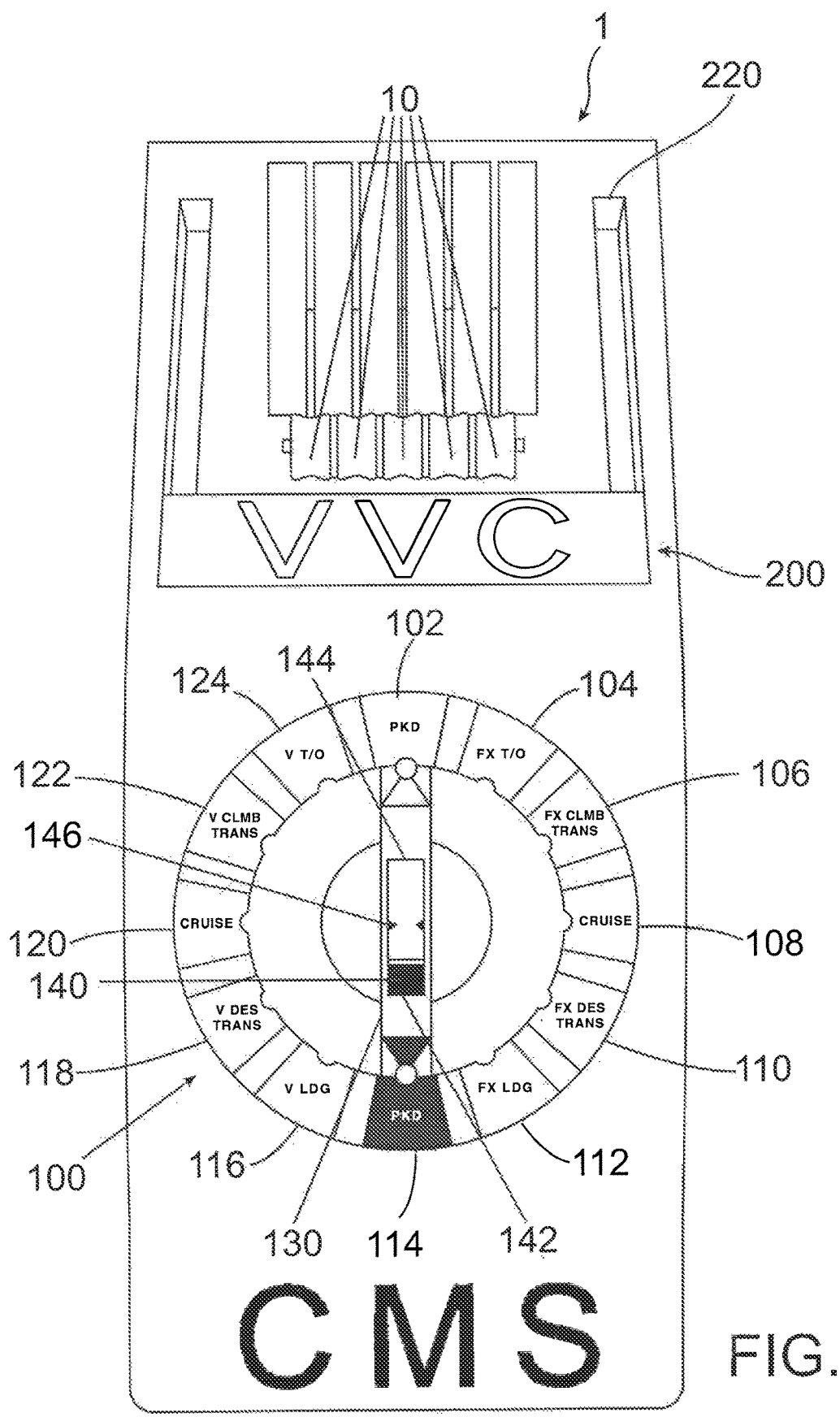

As shown in FIGS. 1-3, in one aspect of the invention, the Curtis Protocol 1 can replace the flap lever and occupy the space on the pedestal between the two pilot seats behind thrust levers 10. Modern aircraft are operated using two-way digital information flowing from sensors tailored for their specific use. These data streams are processed by different computers and then fed to a central flight management system—a specialized computer—that can be commanded by the pilot to handle various levels of automation throughout the flight to reduce the workload of the flight crew. Each flight management system must be certified by the FAA. The software and subtleties of the systems vary between aircraft types and makes. The flight management system also controls and modifies the various aircraft control systems, power systems, and/or exterior control surfaces.

The Curtis Protocol 1 can include two controls—Control Mode Selector (CMS) 100 and Vertical Velocity Control (VVC) 200—that interface with the flight management system of the particular aircraft type. In one aspect of the invention, the aircraft manufacturer can decide what data streams are commanded by the Curtis Protocol 1 to bring about operation and flight of the aircraft.

As shown in FIG. 1, CMS 100 and VVC 200 fit seamlessly into the prototypical modern cockpit. The Curtis Protocol 1 provides standardized division and selection of standard flight regimes and flight modes within the selected flight regime. CMS 100 enables the pilot to place the aircraft into an operational flight regime and into a number of flight modes within the selected flight regime. VVC 200 is only active during the vertical flight regime for vertical modes of operation. VVC 200 deploys automatically extending VVC lever 204 when the pilot selects a vertical mode in the vertical flight regime on CMS 100, as discussed in detail below.

In one aspect of the invention, CMS 100 can include flight mode selections for a non-vertical or forward flight regime including forward takeoff flight mode (FX T/O) 104, forward climb transition flight mode (FX CLMB TRANS) 106, cruise flight mode 108, forward descent transition flight mode (FX DES TRANS) 110, and forward landing flight mode (FX LDG) 112.

In another aspect of the invention, CMS 100 can include flight mode selections for a vertical flight regime including vertical takeoff flight inode (V T/O) 124, vertical climb transition flight mode (V CLMB TRANS) 122, Cruise flight mode 120, vertical descent transition flight mode (V DES TRANS) 118, and vertical landing flight mode (V LDG) 116.

CMS 100 can also include non-flight mode selections for parked (PKD) 102 and 114. As discussed further below, pilot selection of one of the respective modes 102-124 can modify the aircraft control systems, power systems, and/or exterior control surfaces for the selected flight regime and flight mode.

Referring now to FIGS. 4-16, CMS 100 can include a rotary switch 130 and a slider 140. Slider 140 can move between first position 142, second position 144, and third position 146 on rotary switch 130. The position of slider 140 on rotary switch 130 specifies the active end of rotary switch 130 and allows the pilot to transition from a forward flight regime to a vertical flight regime when in cruise flight mode 108 or 120. For example, when slider 140 is placed in first position 142, indicator 132 on rotary switch 130 becomes active and the signal input representative of the flight mode adjacent indicator 132 is transmitted by CMS 100 to the flight management system. Conversely, when slider 140 is placed in second position 144, indicator 134 on rotary switch 130 becomes active and the signal input representative of the flight mode adjacent indicator light 134 is transmitted by CMS 100 to the flight management system. In one aspect of the invention, indicators 132 and 134 can include a light to provide a visual reference to the pilot. In another aspect of the invention, indicators 132 and 134 can provide tactile or audible feedback to the pilot. In a further aspect of the invention, indicators 132 and 134 can be integrated to provide a visual reference to the pilot on a heads up display. In another aspect, indicators 132 and 134 can provide a visual reference to the pilot displayed on the glare shield in front of each pilot. In one aspect of the invention, slider 140 can include a light to provide a visual reference to the pilot. In another aspect of the invention, slider 140 can provide tactile or audible feedback to the pilot.

When the pilot selects a flight mode on CMS 100, CMS 100 transmits a signal input to the flight management system indicative of the selected flight mode to modify the flight characteristics of the aircraft—control systems, power systems, and exterior control surfaces—for the specific flight mode and the current aircraft flight conditions. The current aircraft flight conditions may include, but are not limited to: airspeed, attitude, altitude, vertical speed, roll rate, engine thrust, engine speed (RPM), aircraft load, onboard fuel, ambient temperature, and relative windspeed, as would become apparent to a person of ordinary skill in the art.

Modes 102-124 on CMS 100 are arranged so as to progressively modify the flight characteristics of the aircraft for an appropriate flight regime and flight mode based on the current aircraft flight conditions and the intending flight path. In this aspect, rotary switch 130 can only be rotated clockwise in the progression from: parked mode 102 to forward takeoff flight mode 104 to forward climb transition flight mode 106 to cruise flight mode 108 to forward descent transition flight mode 110 to forward landing flight mode 112 to parked mode 114. In a similar fashion, rotary switch 130 can only be rotated anticlockwise in the progression from: parked mode 102 to vertical takeoff flight mode 124 to vertical climb transition flight mode 122 to cruise flight mode 120 to vertical descent transition flight mode 118 to vertical landing flight mode 116 to parked mode 114. These progressions allow the pilot to safely and efficiently modify the flight characteristics of the aircraft over the course of the flight. In another aspect of the invention, in cruise flight mode 108 or 120, slide selector 140 can be unlocked to allow the pilot to transition between the vertical flight regime and the forward flight regime.

In another aspect of the invention, CMS 100 can be selectively locked to prevent the pilot from inadvertently selecting an inappropriate flight mode based on the current flight characteristics of the aircraft. For example, when the pilot moves rotary switch 130 to select forward takeoff 104 (FIG. 5), CMS transmits an input to the flight management system to modify the flight characteristics of the aircraft—control systems, power systems, and exterior control surfaces—for the forward takeoff configuration of the aircraft. During takeoff, rotary switch 130 and slider 140 will be locked in place at forward takeoff mode 104 until the flight management system evaluates the aircraft flight conditions and determines that the pilot can safely transition the aircraft to the next flight mode, in this case, forward climb transition flight mode 106. In one aspect of the invention, the active indicator 132 or 134 on rotary switch 130 can flash on and off to alert the pilot that the aircraft can safely transition to the next flight mode. In another aspect of the invention, a visual indicator on slider 140 can flash to alert the pilot that the aircraft can safely transition to the next flight mode. In a further aspect of the invention, CMS 100 can provide an audible indicator to alert the pilot that the aircraft can safely transition to the next flight mode.

In one aspect of the invention, slider 140 can be selectively locked by control logic associated with the flight management system. In a further aspect, slider 140 can only be moved manually between first position 142 and second position 144 when rotary switch 130 is positioned at cruise flight mode 108, 120 to prevent the pilot from inadvertently switching the aircraft from the forward flight regime to the vertical flight regime or from the vertical flight regime to the forward flight regime. In this aspect, slider 140 is locked in position on rotary switch 130 in flight modes 106, 110, 112, 116, 118, and 122. In another aspect, slider 140 can be moved automatically between first position 142 and second position 144 when rotary switch 130 is positioned at parked mode 102, 114. In the event of a rejected takeoff, the pilot can manually move slider 140 to third position 146 on rotary switch 130 to reset the aircraft to parked mode, typically once the aircraft has returned to the gate. In essence, moving slider 142 third position 146 commands the aircraft to configure for ground operations.

In one aspect of the invention, parked mode 114 can be used for an aircraft where all electrical systems are turned off and the aircraft is parked for an extended period of time. In parked mode 114, the movable exterior control surfaces can be locked and the aircraft can be properly configured for drainage of rainwater or other moisture, for example.

In a further aspect of the invention, the pilot can activate the aircraft electrical system by turning on the battery switch. After activation, the flight management system can automatically move slider 140 from second position 144 to first position 142 on rotary switch 130 in response to battery switch activation thus activating indicator 132 and parked mode 102 on CMS 100. In this aspect, CMS 100 transmits a signal input to the flight management system indicative of the selected parked mode 102. In an alternate aspect of the invention, the pilot can move slider 140 from second position 144 to first position 142 on rotary switch 130. In parked mode 102, the pilot can start one or more of the aircraft engines to provide auxiliary power while the aircraft is on the ground. In parked mode 102, the pilot can consider the desired departure direction, wind, visibility, and obstructions.

After completing flight preparation and ground procedures, the pilot can move rotary switch 130 to select forward takeoff flight mode 104. After the pilot selects forward takeoff flight mode 104, CMS 100 transmits a signal input to the flight management system indicative of the selected flight mode. In one aspect, forward takeoff flight mode 104 can start the primary power systems and engines required for flight. In another aspect, the flight characteristics of the aircraft—control systems, power systems, and exterior control surfaces—can be configured for forward takeoff. For example, the aircraft wings can be configured to provide additional lift through flaps or other means and the power systems can be configured to provide additional thrust as required for a forward takeoff. Nose wheel steering and/or nose wheel drive can also be enabled. In one aspect, after the pilot selects forward flight mode 104, the CMS 100 can only be reversed in the event of a rejected takeoff. In this aspect, slide 140 can be moved to third position 146 to unlock rotary switch 130 so that the pilot can move rotary switch 130 back to parked mode 102 after a rejected takeoff.

After takeoff, the flight management system can evaluate the current aircraft flight conditions to determine whether the pilot can safely transition the aircraft to the next flight mode, forward climb transition flight mode 106. In one aspect of the invention, after the flight management system determines that the aircraft can safely transition to the next flight mode, the lock on rotary switch 130 disengages so that the pilot can move rotary switch 130 to forward climb transition flight mode 106. After the pilot selects forward climb transition flight mode 106, CMS 100 transmits a signal input to the flight management system indicative of the selected flight mode. In forward climb transition flight mode 106, the aircraft flight characteristics are configured for climb. For example, the aircraft wing camber and/or angle of incidence can be modified for climb and the power systems can be retarded to climb thrust. In another aspect, the engine angle of thrust can be modified.

In one aspect of the invention, after climbing to the initial cruise altitude, the flight management system can evaluate the current aircraft flight conditions to determine whether the pilot can safely transition the aircraft to the next flight mode, cruise flight mode 108. In one aspect of the invention, after the flight management system determines that the aircraft can safely transition to the next flight mode, the lock on rotary switch 130 disengages so that the pilot can move rotary switch 130 to cruise flight mode 108. After the pilot selects cruise flight mode 108, CMS 100 transmits a signal input to the flight management system indicative of the selected flight mode. In cruise flight mode 108, the aircraft flight characteristics are configured for cruise—e.g. minimal drag, high speed, fuel balance, and maximum fuel efficiency. In one aspect, the flight management system can use aircraft trim and auto-throttles to execute cruise altitude climbs or descents. In cruise flight mode 108, slide selector 140 can be unlocked to allow the pilot to transition to the vertical flight regime and the vertical flight modes, as discussed further below.

Upon nearing the target/destination, the pilot can slow to descent speed and the flight management system can evaluate the current aircraft flight conditions to determine whether the pilot can safely transition the aircraft to the next flight mode, forward descent transition flight mode 110. In one aspect of the invention, after the flight management system determines that the aircraft can safely transition to the next flight mode, the lock on rotary switch 130 disengages so that the pilot can move rotary switch 130 to forward descent transition flight mode 110. After the pilot selects forward descent transition flight mode 110, CMS 100 transmits a signal input to the flight management system indicative of the selected flight mode. In forward descent transition flight mode 110, the aircraft flight characteristics are configured for aircraft descent. For example, the aircraft exterior control surfaces including wing camber and/or angle of incidence can be modified for slow flight. In another aspect, cabin pressurization can be scheduled down to the landing elevation At the initial approach point, the flight management system can evaluate the current aircraft flight conditions and speed to determine whether the pilot can safely transition the aircraft to the next flight mode, forward landing flight mode 112. In one aspect of the invention, after the flight management system determines that the aircraft can safely transition to the next flight mode, the lock on rotary switch 130 disengages so that the pilot can move rotary switch 130 to forward landing flight mode 112. After the pilot selects forward landing flight mode 112, CMS 100 transmits a signal input to the flight management system indicative of the selected flight mode. In forward landing flight mode 112, the aircraft flight characteristics are configured for landing. For example, the aircraft exterior control surfaces can deploy the trailing edges and the landing gear can be enabled for manual selection by the pilot depending on the drag requirements.

In another aspect of the invention, go-round mode can be armed in forward landing flight mode 112. If a go-round is activated in the forward flight regime by engaging go-round switch 12, the Curtis Protocol 1 can automatically update all flight systems on the aircraft. For example, the flight management system can auto-configure the aircraft into forward takeoff flight mode 104 upon activation of go-round switch 12. In this aspect, rotary switch 130 and slider 140 on CMS 100 can reposition in the clockwise direction to activate forward takeoff flight mode 104. For example, rotary switch 130 can rotate to parked mode 114 while slider 140 moves from first position 142 to second position 144. Rotary switch 130 can then rotate clockwise to forward takeoff flight mode 104. CMS 100 will remain in this mode until the pilot presses slider 140 multiple times signaling a desire to switch to another flight mode. Once at the appropriate altitude, the pilot can sequence through the flight modes to cruise flight mode 108 and can then determine the next appropriate action. In one aspect, the aircraft may momentarily touch down on the runway as the go-round is executed.

After landing and parking the aircraft, prior to turning off all electrical systems the pilot can move rotary switch 130 to parked mode 114. In one aspect, after shutdown and deactivation of the battery switch, the flight management system can automatically move slider 140 to position 144 and turn off all lights and indicators associated with the Curtis Protocol 1.

In another aspect of the invention, the pilot can utilize a vertical flight regime for the aircraft. After completing flight preparation, when establishing electric power, slide 140 can automatically move to first position 142 and the relevant lighting and indicators on the Curtis Protocol 1 will activate. The pilot can then move rotary switch 130 to select vertical takeoff flight mode 124 from parked mode 102. Upon selection, VVC lever 204 extends to cover thrust levers 10 and VVC indicator 202 activates. In one aspect of the invention, VVC lever 204 can be used to control the ascent or descent rate of the aircraft. For example, engine thrust control, wing rotation rate, vectored thrust rate, and/or movement of exterior lift producing devices or control surfaces can be tied to the movement of VVC lever 204. In one aspect of the invention, the fore and aft movement of VVC lever 204 controls the rate of ascent or descent of the aircraft. For example, moving VVC lever 204 towards forward position 220 can increase ascent rate or decrease the descent rate of the aircraft while moving VVC lever 204 towards rear position 210 can decrease ascent rate or increase descent rate of the aircraft. Detent 230 is provided in VVC 200 as a reference position for the pilot.

After the pilot selects vertical takeoff flight mode 124, CMS 100 transmits a signal input to the flight management system indicative of the selected flight mode. In one aspect, vertical takeoff flight mode 124 can start the primary power systems and engines required for vertical flight. In another aspect, the flight characteristics of the aircraft—control systems, power systems, and exterior control surfaces—can be configured for vertical takeoff. For example, if the wing of the aircraft is movable, the aircraft wings can begin to spin to provide lift. Additionally, the power systems can be configured to provide appropriate thrust as required for a vertical takeoff. In one aspect, after the pilot selects vertical flight mode 124, the CMS 100 can only be reversed in the event of a rejected takeoff. In this aspect, slide 140 can be moved to center position 146 to unlock rotary switch 130 so that the pilot can move rotary switch 130 back to parked mode 102.

After takeoff and climb to obstruction clearance altitude, the pilot can retract the landing gear and the flight management system can evaluate the current aircraft flight conditions to determine whether the pilot can safely transition the aircraft to the next flight mode, vertical climb transition flight mode 122. In one aspect of the invention, after the flight management system determines that the aircraft can safely transition to the next flight mode, the lock on rotary switch 130 disengages so that the pilot can move rotary switch 130 to vertical climb transition flight mode 122. After the pilot selects vertical climb transition flight mode 122, CMS 100 transmits a signal input to the flight management system indicative of the selected flight mode. In vertical climb transition flight mode 122, the aircraft flight characteristics are configured for climb. For example, the rotation of the movable wing can be slowed and secured for a more efficient climb and the power systems can be retarded to climb thrust.

In one aspect of the invention, after climbing to the initial cruise altitude, the flight management system can evaluate the current aircraft flight conditions to determine whether the pilot can safely transition the aircraft to the next flight mode, cruise flight mode 120. In one aspect of the invention, after the flight management system determines that the aircraft can safely transition to the next flight mode, the lock on rotary switch 130 disengages so that the pilot can move rotary switch 130 to cruise flight mode 120. After the pilot selects cruise flight mode 120, CMS 100 transmits a signal input to the flight management system indicative of the selected flight mode. In a further aspect, VVC lever 204 can retract to expose thrust levers 10 and VVC indicator 202 can deactivate. In cruise flight mode 120, the aircraft flight characteristics configured for cruise—e.g. minimal drag, high speed, fuel balance, and maximum fuel efficiency—and are identical to those in cruise flight mode 108. In one aspect, the flight management system can use aircraft trim and auto-throttles to execute cruise altitude climbs or descents. In cruise flight mode 120, slide selector 140 can be unlocked to allow the pilot to transition to the forward flight regime and the forward flight modes.

Upon nearing the target/destination, the pilot can slow to descent speed and the flight management system can evaluate the current aircraft flight conditions to determine whether the pilot can safely transition the aircraft to the next flight mode, vertical descent transition flight mode 118. In one aspect of the invention, after the flight management system determines that the aircraft can safely transition to the next flight mode, the lock on rotary switch 130 disengages so that the pilot can move rotary switch 130 to vertical descent transition flight mode 118. After the pilot selects vertical descent transition flight mode 118, CMS 100 transmits a signal input to the flight management system indicative of the selected flight mode, VVC lever 204 extends to cover thrust levers 10, and VVC indicator 202 activates. In vertical descent transition flight mode 118, the aircraft flight characteristics are configured for vertical aircraft descent. For example, the aircraft wing may again rotate to assist with vertical flight.

After reaching the landing zone, the flight management system can evaluate the current aircraft flight conditions to determine whether the pilot can safely transition the aircraft to the next flight mode, vertical landing flight mode 116. In one aspect of the invention, after the flight management system determines that the aircraft can safely transition to the next flight mode, the lock on rotary switch 130 disengages so that the pilot can move rotary switch 130 to vertical landing flight mode 116. After the pilot selects vertical landing flight mode 116, CMS 100 transmits a signal input to the flight management system indicative of the selected flight mode and the pilot can move VVC lever 204 to detent 230. In vertical landing flight mode 116, the aircraft flight characteristics are configured for vertical landing. For example, the aircraft will allow the pilot to manually put the landing gear down and allow the aircraft to slowly descend to touchdown. In another aspect of the invention, depending on the aircraft type, once vertical landing flight mode 116 is selected, horizontal maneuvering can be transferred to the normal flight controls for the activation of thrusters or vectoring of main engine thrust. In another aspect, the aircraft can include a small joystick for horizontal maneuvering in vertical landing flight mode 116.

In another aspect of the invention, escape maneuver is armed in vertical landing flight mode 116. If escape maneuver is activated in the vertical flight regime by engaging button 206 on either side of VVC lever 204 and advancing VVC lever 204 all the way to forward position 220, the Curtis Protocol 1 can automatically update all flight systems on the aircraft. For example, the flight management system can auto-configure the aircraft into vertical takeoff flight mode 124 upon activation of button 206 and advancement of VVC lever 204 to forward position 220. In this aspect, rotary switch 130 and slider 140 on CMS 100 can reposition in the counterclockwise direction to activate vertical takeoff flight mode 124. For example, rotary switch 130 can rotate to parked mode 114 while slider 140 moves from first position 142 to second position 144. Rotary switch 130 can then rotate counterclockwise to vertical takeoff flight mode 124. CMS 100 will remain in this mode until the pilot presses button 206 multiple times signaling a desire to switch to another flight mode. Once at the appropriate altitude, the pilot can sequence through the flight modes to cruise flight mode 120 and can then determine the next appropriate action.

After touchdown, VVC lever 204 can be positioned in detent 230 to maintain the aircraft in a potential vertical takeoff flight mode until the pilot decides an escape maneuver is not required. The pilot can then push button 206 on VVC lever 204 to retard VVC lever to stop at rear position 210. After landing and parking the aircraft, the pilot can move rotary switch 130 to parked mode 114. After selection, VVC lever 204 can retract and VVC indicator 202 can deactivate.

Figure 17:
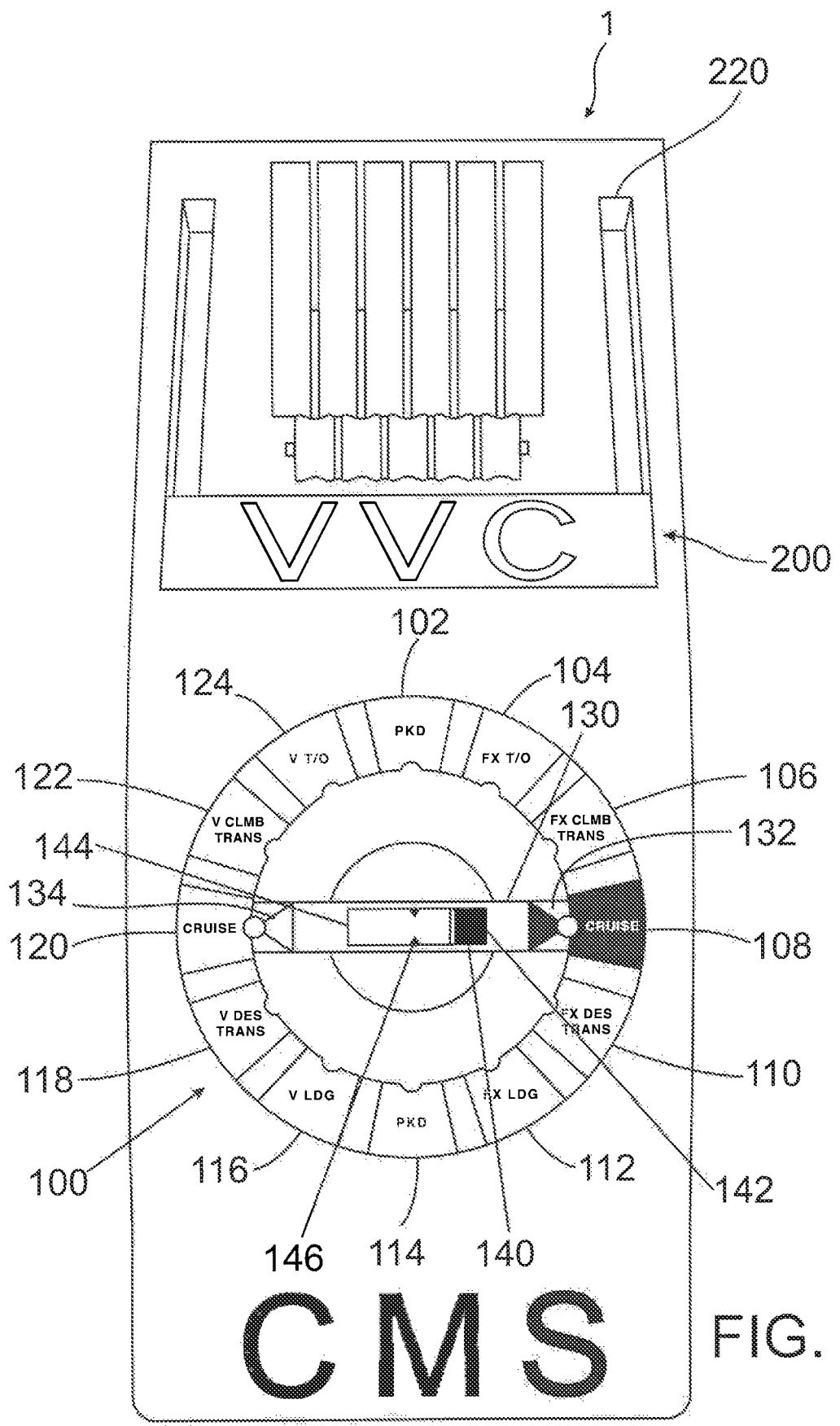
Figure 18:
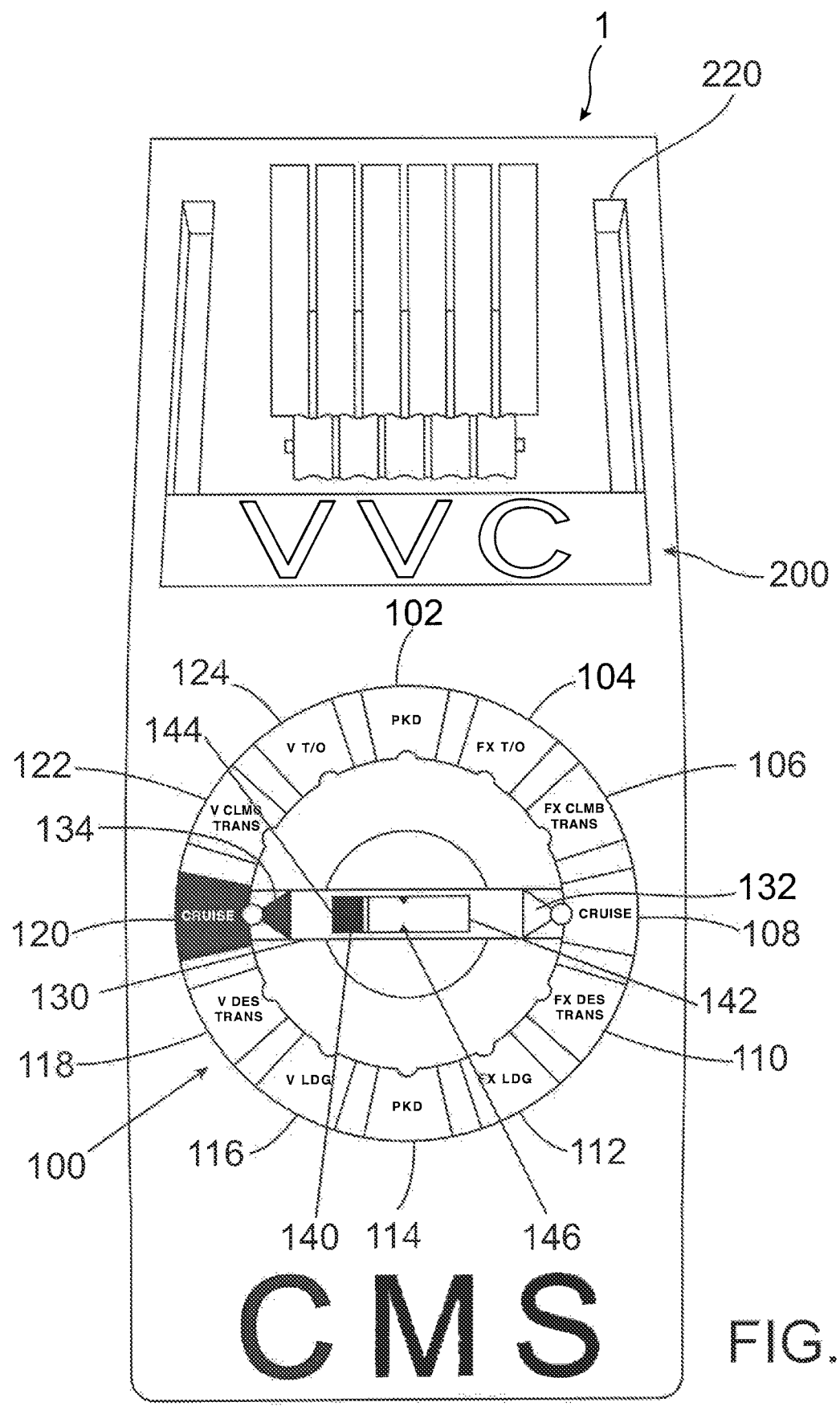

As shown in FIGS. 17-18, in another aspect of the invention, the pilot can takeoff in a first flight regime and land in a second flight regime by moving slider 140 from first position 142 to second position 144 when rotary switch 130 is positioned between cruise flight mode 108 and cruise flight mode 120. For example, in cruise flight mode 108, the pilot can transition between a forward flight regime and a vertical flight regime by moving slider 140 on rotary switch 130 from first position 142 to second position 144 to change the active end of rotary switch 130. When slider 140 occupies second position 144, indicator 134 becomes active demonstrating that the aircraft is in the vertical flight regime and ready for vertical flight modes. Once the pilot selects vertical descent transition flight mode 118, VVC indicator 202 activates and VVC lever 204 extends to cover thrust levers 10. Alternatively, in cruise flight mode 120 the pilot can transition between a vertical flight regime and a forward flight regime by moving slider 140 from first position 142 to second position 144 to activate cruise flight mode 108.

In one aspect of the invention, the particular aircraft flight characteristics—control systems, power systems, and exterior control surfaces—for a selected flight mode can be determined by the multirole aircraft manufacturer. For example, an aircraft manufacturer utilizing the Curtis Protocol 1 on a multirole aircraft with a movable wing can specify that the movable wing be stabilized and stationary in the forward flight regime and flight modes and movable in the vertical flight regime and vertical flight modes. The multirole aircraft can also include movable power systems or directed thrust systems that are modified in accordance with a selected flight mode It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A control system for an aircraft, the control system comprising:
   a yoke to control a roll axis and pitch of the aircraft;
   an interface to provide a first input to a flight computer representative of a first flight regime and a second input to the flight computer representative of a second flight regime; and
   a vertical velocity control to control an ascent rate or a descent rate of the aircraft in the first flight regime.

2. The aircraft control system of claim 1, wherein the first flight regime is a vertical flight regime and the second flight regime is a forward flight regime.

3. The aircraft control system of claim 2, wherein the forward flight regime includes a forward takeoff mode, a forward climb transition mode, a forward cruise mode, a forward descent transition mode, and a forward landing mode.

4. The aircraft control system of claim 1, wherein the vertical flight regime includes a vertical takeoff mode, a vertical climb transition mode, a vertical descent transition mode, and a vertical landing mode.

5. The aircraft control system of claim 1, wherein the interface is configured to provide nine inflight inputs to the flight computer, each of the inflight inputs being representative of a distinct flight mode.

6. The aircraft control system of claim 1, wherein the interface is a rotary switch.

7. The aircraft control system of claim 1, wherein the flight computer modifies an exterior control surface of the aircraft in response to the input.

8. The aircraft control system of claim 6, wherein the interface comprises a switch to selectively permit the interface to provide the first input or the second input.

9. The aircraft control system of claim 1, wherein the vertical velocity control is accessible in the first flight regime and inaccessible in the second flight regime.

10. The aircraft control system of claim 9, wherein the vertical velocity control includes a lever, such that a first directional movement of the lever increases vertical speed and a second directional movement of the lever decreases vertical speed.

11. The aircraft control system of claim 10, wherein the vertical velocity control lever includes a first lock position that relates to a first vertical speed.

12. A method for controlling a multi-role aircraft in flight, comprising:
   operating the aircraft in a first flight regime, the aircraft being configured for the first flight regime in response to a first input from an interface;
   operating the aircraft in a second flight regime, the aircraft being configured for the second flight regime in response to a second input from the interface;
   controlling a roll axis and pitch of the aircraft using a yoke;
   controlling a vertical speed of the aircraft using a vertical velocity control in the first flight regime.

13. The method of claim 12, wherein the first flight regime is a vertical flight regime.

14. The method of claim 12, wherein the first flight regime is a forward flight regime.

15. The method of claim 12, wherein the first input and the second input are selectively controlled by a transition input from a switch such that providing the transition input includes moving the switch from a first position representative of the first flight regime to a second position representative of the second flight regime.

16. An aircraft control system comprising:
   a control mode selector to provide an input to configure the aircraft for a selected flight regime;
   a flight management system to receive the input and configure the aircraft for the selected flight regime by modifying an exterior control surface of the aircraft;
   a yoke to control a roll axis and pitch of the aircraft; and
   a vertical velocity control lever to provide a vertical speed input to the flight computer to control a vertical speed of the aircraft.

17. The aircraft interface of claim 16, wherein the vertical velocity control lever is accessible in a vertical flight regime and inaccessible in a forward flight regime.

* * * * *